Aug. 13, 1963     G. J. RITTENHOUSE     3,100,659

HEAVY DUTY DISCHARGE HOSE SPLICE

Filed Nov. 13, 1961

INVENTOR
GODFREY J. RITTENHOUSE
BY
ATTORNEY

United States Patent Office 3,100,659
Patented Aug. 13, 1963

3,100,659
HEAVY DUTY DISCHARGE HOSE SPLICE
Godfrey J. Rittenhouse, Feasterville, Pa., assignor to H. K. Porter Company, Inc., Philadelphia, Pa., a corporation of Delaware
Filed Nov. 13, 1961, Ser. No. 151,721
3 Claims. (Cl. 285—260)

This invention relates to heavy duty discharge hose and is especially directed to an improved splice for uniting end to end sections of the hose to produce a multiple length hose free of intermediate couplings and having substantially uniform physical properties throughout its extent.

Heavy duty discharge hose for present service requirements comprises elastomeric materials such as synthetic rubber in its innermost and outermost layers or plies and a plurality of reinforcing plies of rubber impregnated fabric usually synthetic fiber yarns woven into "tire cord fabric," a special weave in which a relatively great density of high strength warp yarns are held together by weak and widely spaced filler yarns, the yarns of both types commonly being disposed in the hose helically and hence at angles to the hose axis and not respectively normal and parallel thereto.

Such hose is made on a mandrel in lengths of up to 80′ which is about the practical length limit for a mandrel which can be used for this purpose, as there has not been devised means for progressively manufacturing it continuously in indefinite greater lengths. Obviously, however, when a hose is required for refueling at sea or conducting fluid between a shore station and a vessel anchored at some distance away much greater lengths of hose are required and until the invention of the splice disclosed in Galloway Patent 2,930,406 it was the practice to affix heavy metal couplings at the ends of a number of hose sections and couple them together to attain the necessary length.

The splice of that patent made it practical to produce heavy duty discharge hoses of indefinite length usually limited only by the quantity of hose which could be handled as one piece by available equipment, and the need for metal couplings for securing a number of hose sections together end to end was thereby greatly minimized and, in some instances, eliminated. It has been found in practice, however, particularly when the so-spliced hose is used for coveying certain liquid petroleum products high in aromatic constituents, it sometimes develops minute internal cracks at the plane of juncture of the rubber inner linings or tubes of the sections joined at the splice as a result of which the contents of the hose seep through to contact with the surrounding fabric reinforcing layers and by capillary action then travel longitudinally through them as well as radially from one layer to the next, thus tending to impair the adherence between the fabric and the rubber or other elastomer impregnating it resulting in ultimate failure of the hose at or adjacent the splice.

It is known that vulcanization effects a chemical change in elastomeric compositions and it is thought the Galloway splice may fail, when it does, primarily because in its construction the elastomeric inner linings or tubes of the hose sections to be spliced are brought into abutting co-axial relation and overlaid with axially relatively short layers of rubber impregnated nylon tape after which layers of rubber-impregnated nylon cord fabric are applied, one of them extending angularly outward in opposite directions from the longitudinal center of the splice almost to its outer surface. It results that the inner linings of the sections, which previously have been vulcanized when made into hose, do not bond to each other perfectly when the splice is vulcanized and the initially uncured rubber with which the nylon tape is impregnated sometimes makes but an imperfect union with the prevulcanized inner linings. When this occurs and the spliced hose is placed in service for conveying such low surface tension petroleum products as jet engine fuels relatively high in aromatic constituents, the fluid may seep through the imperfectly bonded areas comprising the minute cracks above mentioned, contact with the textile fabrics incorporated in the splice and thence progress by capillary action along their yarns, impairing the bond between the fabric and adjacent rubber as it goes. This is particularly the case when the fluid reaches that fabric layer which, as above noted, extends angularly outward from the interior of the splice and thus spans in close proximity the ends of many of the fabric plies in both hose sections as the said layer then acts as a sort of wick to convey the fluid quickly to the fabric of the plies and toward the exterior of the hose.

While such failures are rare they do nevertheless present a problem in the industry and it is a principal object of the present invention to provide an improved splice for heavy duty discharge hose which safeguards against seepage of the hose contents into contact with the fabric reinforcing layers in the hose.

A further object is to provide a splice in which the inner elastomeric linings of the hose sections connected together thereby are integrally bonded to interposed elastomeric material applied during manufacture of the splice to eliminate entrapment of air and insure intimate contact between the supplied uncured elastomeric material with the previously cured elastomeric linings of the hose sections whereby the occurrence of such cracks is greatly reduced and the useful life of the spliced hose thereby substantially prolonged.

Other objects, purposes and advantages of my invention will hereinafter more fully appear or will be understood from the following description of a preferred embodiment of it illustrated in the accompanying drawing in which.

Figure 1:
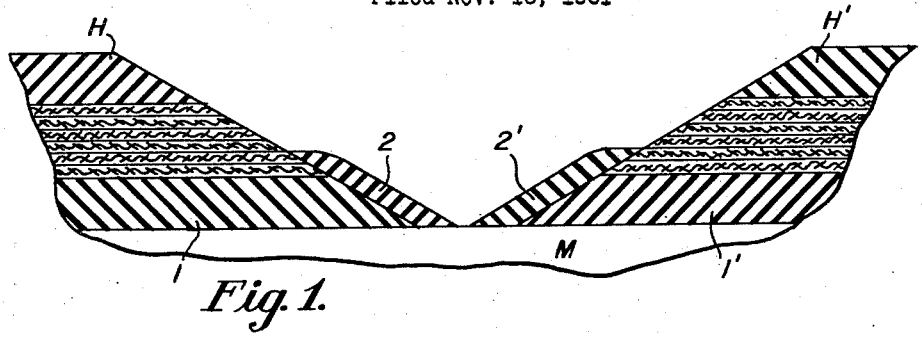
FIG. 1 is a fragmentary longitudinal section of the ends of two pieces of hose prepared for splicing taken on a plane containing the common axis of the pieces and the mandrel on which they are temporarily mounted while being spliced.
Figure 2:
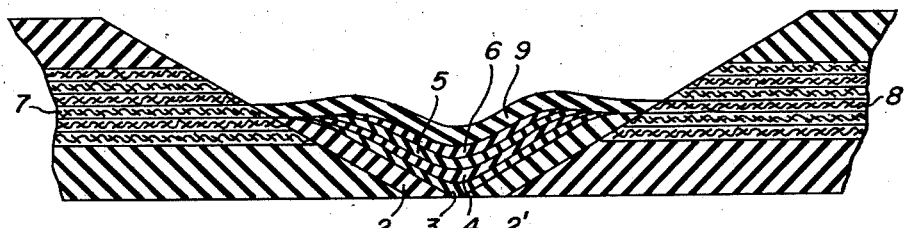
FIG. 2 is a similar section of the hose pieces showing the splice in one stage of partial completion, the mandrel for simplicity being omitted in this and succeeding figures.
Figure 3:
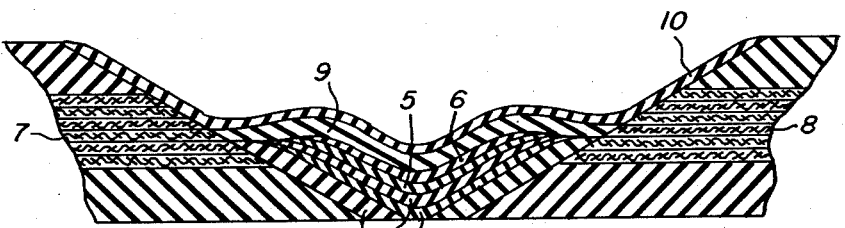
FIG. 3 is a like section at a further stage.
Figure 4:
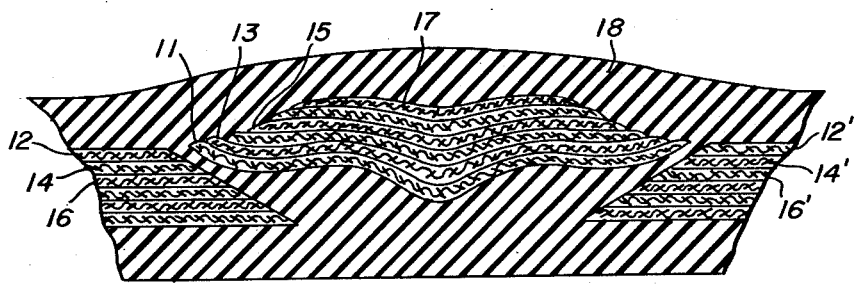
FIG. 4 is a corresponding section of the completed splice.

Referring now more particularly to the drawing the mandrel M, usually a hollow cylindrical steel tube having closed ends and provided with means (not shown) for internally heating it, may be substantially identical with the mandrel used for making the splice of said Galloway patent and needs no further detailed description here, save that it includes means for withdrawing it endwise from the hose after the splice has been constructed about it.

The pieces of hose H, H' to be spliced are prepared for splicing, usually before the mandrel is entered in them, by tapering their ends for a considerable distance preferably at a small angle (greatly exaggerated in the drawing) to the hose axis. It is preferred this taper be so gradual as to terminate successive plies of the fabric reinforcement in the hose up to an inch or more apart, measured axially of the hose, and while I have illustrated and shall herein describe a splice made in 6-ply hose sections, it is to be understood that when hose containing a different number of reinforcing plies are spliced like principles are employed as will hereinafter more fully appear.

After the hose ends have been thus tapered they are positioned to receive mandrel M and disposed thereon preferably with their elastomeric inner linings or tubes 1, 1' about ¼" apart. A strip of uncured elastomeric material preferably of composition similar to or compatible with the inner linings is then cemented about each of the hose ends preferably to extend from within the gap between tubes 1,1' axially to about the ends of the third innermost plies of fabric reinforcement in the hose sections. These strips 2, 2' thus occupy part of said gap and reduce its width to about 1/16"–⅛"; although in the drawing for clearness of illustration thicknesses of the various plies and other elements is necessarily exaggerated resulting in some distortion, it is desirable strips 2, 2' extend into the said gap beyond the inner tubes but short of contact with each other. After strips 2, 2' have been applied and the cement holding them in place has set they may be buffed to produce relatively smooth "feathered" edges proximate the ends of the hose sections and cleaned, after which uncured rubber strip, about .109" thick but stretched to reduce its thickness to about .078" is wound spirally under tension about the splice in four layers 3, 4, 5, 6 in a continuous winding, the strip being of a width approximately to span strips 2, 2' to which said layers are snugly conformed by the tension applied in winding them on the splice. The end of the strip next is adhered to the splice to prevent its becoming unwound and the splice area between the ends of the third plies 7, 8 is then coated with a suitable elastomeric adhesive and a somewhat wider layer 9 of uncured rubber tube compound is applied after which a blanket of uncured rubber 10 is wrapped about the whole splice area with its ends cemented and lapped to secure one to the other, this layer thus directly overlying the exposed ends of all fabric reinforcing plies beyond the third innermost one, whatever be the number of plies present in the hose and extending to the outer covers of the hose sections. Following application of blanket 10 strips of cord fabric, to which uncured elastomeric material has been applied by a "skimming" operation, cut on a bias of about 54° are laid over coatings of cement or other suitable adhesive (not shown) corresponding in number to those plies outside the third. Thus in 6-ply hose the first of such strips, i.e. strip 11, is of a width corresponding to the distance between the outermost fabric plies 12, 12', the second strip 13 corresponds in width to the spacing of the next innermost plies 14,14', strip 15 to the spacing of the third innermost plies, 16, 16' and so on until strip 17 corresponding to the spacing of the innermost plies has been applied creating what appears in the drawing as a stepped pyramidal effect. This effect, however, is due to the exigencies of drafting practice as six plies of skimmed tire cord fabric in reality measure in the aggregate only about 1/16" in thickness compared to about 3/32" of rubber in the inner lining and outer cover. After the last fabric layer 17 has been so applied the splice area is again cemented and an outer cover 18 of uncured rubber corresponding to the cover stock of the hose sections is thereby secured in place. The splice is then wrapped in a cloth tape applied under tension in accordance with the procedure described in greater detail in said Galloway patent and the splice components heat-cured likewise as disclosed therein. After curing, of course, mandrel M is removed from the united hose sections through an end of one of them, or it may be only partially withdrawn and another hose section by like procedures spliced to such end and so on indefinitely until a hose of the desired length has been produced.

As will be evident from the foregoing, in the completed splice the juxtaposed ends of the three innermost plies of the hose sections are deeply embedded in elastomeric materials and relatively widely spaced longitudinally; hence they are remote from the region intermediate the ends of the sections where cracking leading to leakage and splice deterioration is mostly likely to occur. It will further be noted that the fabric layers in the splice, which as mentioned are constructed with their warp yarns lying angularly to the hose axis preferably at about +54° to −54°, are progressively narrower, measured axially of the splice, toward the outer surface so that the narrowest one lies just under the rubber cover, the number of such layers, as noted, corresponding to the number of fabric plies in the hose sections, while if desired an additional layer or so covering the entire splice may be added before the outer cover is applied.

I have herein used the terms rubber and elastomeric materials substantially interchangeably, as the more restrictive one, rubber, is in some instances more appropriate than the broader term elastomeric materials which implies materials having some, but not necessarily all, of the properties and characteristics of rubber and of such materials those may be used in making the splice which do possess the desired ones. Moreover in my use of the term rubber I do not desire or intend to exclude either natural or synthetic rubbers in each of which classification there are many chemically distinguishable compositions and it will be understood the specific ones employed is a matter of choice susceptible of wide variation provided they have the desired properties; likewise that changes and modifications in the form and relationship of the various elements and parts thereof entering into the splice, and in the mode of their treatment in so entering them or after they have been entered therein will readily occur to those skilled in the art and may be utilized if desired without departing from the spirit and scope of the invention as defined in the appended claims.

Having thus described my invention, I claim and desire to protect by Letters Patent of the United States:

1. A spliced discharge hose comprising spaced axially aligned tubular portions each having an elastomeric cover, an inner tube and between the tube and cover internal reinforcements including a plurality of plies of elastomer impregnated fabric in opposed relation, the ends of the plies in each portion being spaced axially from the ends of the corresponding ones in the other portion at distances increasing progressively from ply to ply as the outer surface of the hose is approached, a mass of unreinforced elastomeric material overlying the ends of all said plies and continuous with the inner tubes and covers and a plurality of superposed elastomer impregnated fabric strips embedded in and enclosed by said mass, one of said strips substantially overlying and spaced from the opposed ends of the plies in the tubular portions and the other strips extending progressively shorter distances axially of the hose, said strips and said mass substantially filling the space between said portions.

2. A hose as defined in claim 1 in which the warp yarns in the fabric of adjacent strips make substantially equal but opposite angles with the hose axis.

3. A spliced discharge hose comprising spaced axially aligned tubular portions each having an elastomeric cover, an inner tube and between the tube and cover internal reinforcements including a plurality of plies of elastomer impregnated fabric in opposed relation, the ends of the plies in each portion being spaced axially from the ends of the corresponding ones in the other portion at distances increasing progressively from ply to ply as the outer surface of the hose is approached, a plurality of superposed strips of elastomer impregnated fabric between and spaced from the opposed ends of the plies and a mass of elastomeric material extending from the inner surface of the hose between the ends of the plies and the strips and bonded thereto and to the plies, thereby isolating the strips from the plies, entirely surrounding the strips and forming an integral part of the outer surface of the hose between the covers of said tubular portions.

References Cited in the file of this patent

UNITED STATES PATENTS

| | | |
|---|---|---|
| 680,504 | Shepard et al. | Aug. 13, 1901 |
| 2,930,406 | Galloway | Mar. 29, 1960 |
| 3,053,724 | Galloway | Sept. 11, 1962 |

FOREIGN PATENTS

| | | |
|---|---|---|
| 720,183 | Great Britain | Dec. 15, 1954 |